United States Patent [19]
Take et al.

[11] 4,452,858
[45] Jun. 5, 1984

[54] PRODUCTION OF PLATED SHAPED PRODUCT OF POLYAMIDE

[75] Inventors: Katsuo Take; Tsutomu Tamura, both of Otsu, Japan

[73] Assignee: Toyo Boseki Kabushiki Kaisha, Japan

[21] Appl. No.: 339,349

[22] Filed: Jan. 15, 1982

[30] Foreign Application Priority Data

Jan. 22, 1981 [JP] Japan .................................. 56-8730

[51] Int. Cl.³ .......................... B32B 5/16; B32B 15/08
[52] U.S. Cl. .................................... 428/331; 428/458; 428/474.4; 524/456
[58] Field of Search ............... 428/458, 215, 462, 331, 428/328, 474.4, 475.5; 524/456

[56] References Cited

U.S. PATENT DOCUMENTS

| | | |
|---|---|---|
| 3,382,136 | 5/1968 | Bugel et al. .......................... 428/215 |
| 4,225,109 | 9/1980 | Yotsutsuji et al. ............... 428/458 X |
| 4,229,504 | 10/1980 | Brachman ......................... 428/462 X |
| 4,330,587 | 5/1982 | Woodbrey .......................... 428/458 |

Primary Examiner—Thomas J. Herbert, Jr.
Attorney, Agent, or Firm—Jones, Tullar & Cooper

[57] ABSTRACT

In electroplating of a shaped product of a composition comprising a polyamide, the incorporation of powdery wollastonite as a filler in a content of 30 to 60% by weight based on the composition is effective in forming a plated film on the shaped product, the plated film having an excellent appearance and a high adhesive strength. Prior to said electroplating, the use of a 4 to 15% by weight aqueous solution of hydrochloric acid or sulfuric acid for etcing can enhance the adhesive strength markedly.

7 Claims, No Drawings

PRODUCTION OF PLATED SHAPED PRODUCT OF POLYAMIDE

The present invention relates to a plated shaped product of a polyamide, and its production. More particularly, it relates to a plated shaped product of a polyamide having good physical properties, characterized in that the plated film has an excellent surface appearance and a high adhesive strength, and its production.

Hitherto, plated products of ABS resins have been widely used for manufacture of parts of automobiles, electric apparatus, general merchandise, etc. Since, however, ABS resins are not satisfactory in heat resistance, mechanical strength and modulus, their plated products have been mainly employed for decorative purposes. In recent years, the necessity of making light weight automobiles has increased in order to save energy and plated plastic products having excellent heat resistance, mechanical strength and modulus are in demand. In view of such demand, the plating of polyamides has been studied, but the resulting products are not satisfactory in the appearance or adhesive strength of the plated film. Namely, one excellent in appearance is deficient in adhesive strength, while one excellent in adhesive strength has unsatisfactory appearance.

As a result of extensive study, it has now been found that the incorporation of powdery wollastonite into a polyamide is effective in improving the appearance and adhesive strength of plated film formed on a shaped product made of the wollastonite-containing polyamide without deterioration of the excellent physical properties inherent to the polyamide.

According to the present invention, there is provided a composition comprising a polyamide as the major component and powdery wollastonite as a filler in a content of 30 to 60% by weight based on the weight of the composition.

The polyamide as the major component is intended to mean a high molecular weight polymer in which amide linkages (CONH) occur along the molecular chain and includes the self-polycondensation product of a lactam, the polycondensation product between a diamine and a dibasic acid, the self-polycondensation product of $\omega$-amino acid, the copolymerized product of two or more chosen from the monomeric substances as stated above, etc. Typical examples of the polyamide are nylon 6, nylon 11, nylon 66, nylon 610 etc. No particular limitation is present, though nylon 6 and nylon 66 are favorable in view of their excellent heat resistance, mechanical strength and modulus. These polyamides may be used alone or in combination.

Wollastonite comprises mainly calcium silicate ($CaO.SiO_2$). Advantageously, a shaped product made of the wollastonite containing polyamide does not produce any considerable depression in strength at a welded portion, and in this respect, wollastonite is more favorable than other fillers such as glass fibers, carbon fibers, talc, mica and uncalcined clay. It is also advantageous that a shaped product made of the wollastonite-containing polyamide can to be etched appropriately with an aqueous solution of an inorganic acid.

The average particle size of powdery wollastonite may be not more than $10\mu$, preferably not more than $5\mu$. When the particle size is more than $10\mu$, the roughening resulting from etching is too great so that a beautiful appearance is difficult to obtain a surface of the shaped product after plating. The amount of powdery wollastonite to be incorporated into the polyamide is from 30 to 60% by weight, preferably from 40 to 50% by weight, based on the weight of the composition. When the amount is less than 30% by weight, the resulting shaped product has insufficient heat resistance, mechanical strength and modulus. When more than 60% by weight of wollastonite is employed, the molding and processing properties are deteriorated, and a shaped product having a uniform and flat surface is difficult to obtain. Thus, the appearance after plating is poor.

In addition, the above polyamide compositions may contain any conventional additive for improvement or modification of its properties such as a heat-resistant agent, an aging-preventing agent, a weather resistance agent, a nucleating agent, a lubricant, a pigment and an impact resistance agent.

The polyamide containing powdery wollastonite and any other optional component(s) may be molded in any conventional procedure to make a shaped product. Usually, the mixture is first pelletized and then molded with the polyamide in a molten state.

The shaped product thus prepared serves as a substrate and may be plated by any conventional procedure. A typical example of such a conventional procedure comprises the following steps: surface adjustment→degreasing→etching→neutralizing→catalyst-accelerator (or sensitizing-activating)→electroless plating-→electroplating (copper, nickel, chromium). In more detail, the typical procedure comprises: a surface adjustment step for removing flows, fins, etc. on the surface of the shaped product; a degreasing step for removing oil stain and the like adhered to the surface of the shaped product; a physical or chemical etching step to render the surface of the shaped product hydrophilic; a neutralizing step for removing chromium transferred from the etching bath; a catalyst treatment step for depositing palladium or the like on the surface which has been rendered hydrophilic; an accelerator treatment step for activating the deposited palladium or the like; an electroless plating step for precipitating a metallic thin film of nickel or copper on the surface of the shaped product by the use of palladium metal or the like as a catalyst; and an electroplating step with copper, nickel, chromium, etc. After each step as above, water-rinsing is usually applied to the treated product. Any of these steps including water-rinsing may be omitted or modified depending upon the purpose, situation, condition, chemicals, etc. The steps to be applied before the electroless plating are called the pre-treatment steps.

In the present invention, the etching step may be accomplished preferably by the use of an aqueous solution of hydrochloric acid and/or sulfuric acid in a concentration of 4 to 15% by weight, particularly 5 to 8% by weight, for assuring a higher adhesive strength of the plated film to be formed on the shaped product. When the concentration is less than 4% by weight, the effect of etching is low so that a long time is needed for roughening. When the concentration is more than 15% by weight, roughening is too severe so that the appearance and adhesive strength of the plated film are deteriorated. Etching may be carried out usually at a temperature of room temperature (around 0° to 30° C.) to 50° C. for a period of 1 to 30 minutes. Since the polyamide absorbs water resulting in lowering of the mechanical strength and modulus, it is preferred to accomplish the etching at a low temperature within a short period of time to suppress the water-absorption.

Immediate rinsing of the etched product with water sometimes causes whitening so that the adhesive strength of the plated film formed thereon after plating may be lowered. In order to solve this problem, the adoption of post-etching is recommended. This post-etching may be effected by dipping the above etched product in an aqueous solution of an inorganic acid in a concentration of 0.5 to 4% by weight for a period of 0.5 to 2 minutes. As the inorganic acid, there may be used hydrochloric acid, sulfuric acid, phosphoric acid, etc., though hydrochloric acid can be the most favorably employed. By such post-etching, low strength swollen layer at the surface may be selectively eliminated.

The plated product obtained by this invention is provided with a plated film at the surface, the plated film having an excellent appearance and a high adhesive strength. Usually, the adhesive strength of the plated film is not less than 2.4 kg/cm. The plated product has excellent physical properties inherent to the polyamide. Therefore, it can be used as a substitute for metals in manufacture of heat resistant accessories, mirror surfaces, housings, door knobs, back mirror holders, window handles, wheel caps, etc. Advantageously, the wollastonite-containing polyamide can be molded more easily than metals and show a high heat resistance than ABS resins.

Throughout the specification, the term "adhesive strength" is intended to mean the peeling strength of a plated film formed on the surface of a shaped product, and the peeling strength may be indicated by the strength per unit width (kg/cm), which is determined by making a cut in a rectangular form of 1 cm wide on the plated film and peeling off the cut with a rate of 30 mm/minute at an angle of 90°.

This invention will be explained more in detail by the following Examples wherein % is by weight.

EXAMPLE 1

Pellets of a polyamide containing a filler in a content of 40% based on the weight of the polyamide were dried at 100° C. under reduced pressure for 15 hours, molded by the use of a molding apparatus having a cylinder temperature of 270° C., a mold temperature of 100° C. and an injection pressure of 600 kg/cm$^2$ to make a shaped product of 70 mm×150 mm×3 mm as a test piece. The shaped product was subjected to etching with 6% aqueous solution of hydrochloric acid at 40° C. for 10 minutes and then to post-etching with 3% aqueous solution of hydrochloric acid at 40° C. for 1 minute. The etched product was subjected to electroless plating in the manner as shown in Table 1. The electroless plated product was subjected to electroplating in a plating bath comprising cupric sulfate (200 g/L) and conc. sulfuric acid (96%; 50 ml/L) at an initial current density of 0.5 A/dm$^2$ for 10 minutes and at a current density of 3 A/dm$^2$ for 120 minutes to make a plated film of 50μ in thickness. After each of the above treatments, the treated product was rinsed with water. The plated product was subjected to determination of the adhesive strength of the plated film.

The results are shown in Table 2, from which it is understood that the practically acceptable adhesive strength can be achieved only when wollastonite is used as the filler, and insofar as wollastonite is employed, a remarkable adhesive strength is produced irrespective of the kind of the polyamide.

TABLE 1

| Step | Treatment | Treating solutions | | Treating conditions |
|---|---|---|---|---|
| 1 | Catalyst | "Catalyst" (manufactured by Okuno Seiyaku Kogyo K.K.) | 20 ml/L | 40° C., 2 minutes |
| | | conc. Sulfuric acid | 50 ml/L | |
| 2 | Accelerator | conc. Sulfuric acid | 20 ml/L | 40° C., 2 minutes |
| 3 | Post-accelerator | Sodium hydroxide | 5 g/L | 40° C., 2 minutes |
| 4 | Electroless nickel-plating | Nickel sulfate | 30 g/L | 40° C., 5 minutes |
| | | Sodium hypophosphite | 20 g/L | |
| | | Sodium citrate | 40 g/L | |
| | | Ammonia water | 25 ml/L | |

TABLE 2

| Polyamide | Nylon 6 | Nylon 66 | Nylon 6 | Nylon 6 | Nylon 6 | Nylon 6 |
|---|---|---|---|---|---|---|
| Filler | Wollastonite | Wollastonite | Glass fiber | Talc | Mica | Clay |
| Average particle size (μ) | 8 | 8 | 13 | 5 | 9 | 1 |
| Adhesive strength (kg/cm) | 2.8 | 2.5 | 1.0 | 0.3 | 0.3 | 0.4 |

EXAMPLE 2

In the same manner as in Example 1, a shaped product was prepared by the use of pellets of Nylon 6 containing powdery wollastonite as a filler and subjected to etching, post-etching and electroless plating. Then, the electroless plated product was subjected to electroplating in the manner as shown in Table 3. Observation was made on the appearance of the thus plated product.

Separately, the said pellets were molded to make test pieces according to ASTM (American Society for Testing and Materials), and the test pieces were subjected to measurement of heat deformation temperature, flexural strength and flexural modulus.

The results are shown in Table 4, from which it is understood that the heat resistance, mechanical strength and modulus of the shaped product are lowered when the content of the filler is less than 30%, and the appearance of the plated product becomes poor when the content of the filler is more than 60%. It is also understood that the appearance of the plated product is somewhat deteriorated in case of the average particle size of the filler being more than 10μ.

TABLE 3

| Step | Treatment | Treating solutions | | Treating conditions |
|---|---|---|---|---|
| 1 | Nickel strike plating | Nickel sulfate | 200 g/L | 35° C., |
| | | Ammonium chloride | 30 g/L | 0.5 A/dm$^2$, |
| | | pH = 5 | | 5 minutes, |
| 2 | Cupric sulfate plating | Cupric sulfate | 250 g/L | 35° C., |
| | | Sulfuric acid | 50 g/L | 3 A/dm$^2$, |
| | | Gloss agent | Small | 30 minutes |
| 3 | Gloss nickel plating | Nickel sulfate | 300 g/L | 50° C., |
| | | Nickel chloride | 60 g/L | 3 A/dm$^2$, |
| | | Boric cid | 50 g/L | 20 minutes |
| | | Gloss agent | Small | |
| 4 | Chromium plating | Chromic acid | 250 g/L | 45° C., |
| | | Sulfuric acid | 2.5 g/L | 20 A/dm$^2$, |

TABLE 3-continued

| Step | Treatment | Treating solutions | Treating conditions |
|------|-----------|--------------------|--------------------| 
|      |           |                    | 2 minutes          |

TABLE 4

| | | | | | | |
|---|---|---|---|---|---|---|
| Content of filler (%) | 40 | 40 | 40 | 25 | 60 | 70 |
| Average particle size ($\mu$) | 3 | 8 | 13 | 3 | 3 | 3 |
| Heat deformation temperature (°C.) 186 kg/cm$^2$ | 145 | 143 | 141 | 118 | 161 | 165 |
| Flexural strength (kg/cm$^2$) | 1,180 | 1,200 | 1,180 | 900 | 1,100 | 800 |
| Flexural modulus (kg/cm$^2$) | 54,000 | 52,000 | 54,000 | 38,000 | 70,000 | 76,000 |
| Appearance | Good | Good | Somewhat poor | Good | Good | Poor |

EXAMPLE 3

In the same manner as in Example 1, a shaped product was prepared by the use of pellets of Nylon 6 containing as a filler powdery wollastonite of 8$\mu$ in average particle size in a content of 40%. The shaped product was etched with aqueous solution of hydrochloric acid at 40° C. for 10 minutes, optionally followed by post-etching with 3% aqueous solution of hydrochloric acid at 40° C. for 1 minute. The etched product was electroless plated and then electroplated as in Example 1. The plated product was subjected to determination of the adhesive strength of the plated film.

The results are shown in Table 5, from which it is understood that the adhesive strength is much enhanced by application of post-etching. It is also understood that the adhesive strength is influenced by the concentration of hydrochloric acid in the etching solution.

TABLE 5

| Concentration of hydrochloric acid (%) | 3 | 6 | 15 | 20 | 6 | 15 |
|---|---|---|---|---|---|---|
| Post-etching | Done | Done | Done | Done | Not done | Not done |
| Adhesive strength (kg/cm) | 1.4 | 2.8 | 2.7 | 1.6 | 0.5 | 1.2 |

What is claimed is:

1. A plated shaped article, comprising:
   a shaped substrate; and
   a metal layer on the surface of the substrate, wherein:
   (i) the substrate comprises a polyamide and a filler of powdery wollastonite in an amount of 30 to 60% by weight based on the weight of the substrate; and
   (ii) the adhesive strength of the metal layer is enhanced by the wollastonite filler.

2. The plated shaped article as defined in claim 1, wherein the adhesive strength of the metal layer is not less than 2.4 kg/cm.

3. The plated shaped article as defined in claim 1, wherein the metal layer comprises an electroplated layer.

4. The plated shaped article as defined in claim 1, wherein the amount of wollastonite is 40 to 50% by weight.

5. The plated shaped article as defined in claim 1, wherein the plated shaped article is an electroplated shaped article.

6. The plated shaped article as defined in claim 1, wherein the wollastonite has an average particle size of not more than 10$\mu$.

7. The plated shaped article as defined in claim 6, wherein the average particle size of the wollastonite is not more than 5$\mu$.

* * * * *